United States Patent
Hwang

(10) Patent No.: US 8,397,747 B2
(45) Date of Patent: Mar. 19, 2013

(54) BALANCED WATER-INTAKE CONTROL VALVE

(76) Inventor: Biing-Yih Hwang, Linyuan Township (TW)

( * ) Notice: Subject to any disclaimer, the term of this patent is extended or adjusted under 35 U.S.C. 154(b) by 465 days.

(21) Appl. No.: 12/727,226

(22) Filed: Mar. 18, 2010

(65) Prior Publication Data

US 2011/0226351 A1    Sep. 22, 2011

(51) Int. Cl.
*F16K 31/18* (2006.01)
(52) U.S. Cl. ......... 137/426; 137/443; 137/445; 251/279
(58) Field of Classification Search .................. 137/424, 137/445, 434, 426, 443; 251/279
See application file for complete search history.

(56) References Cited

U.S. PATENT DOCUMENTS

| | | | | |
|---|---|---|---|---|
| 1,223,170 A | * | 4/1917 | Hodgson | 137/426 |
| 1,251,235 A | * | 12/1917 | Johnson | 251/367 |
| 1,365,906 A | * | 1/1921 | Gardenier | 137/426 |
| 1,548,859 A | * | 8/1925 | Valerius | 137/410 |
| 2,470,213 A | * | 5/1949 | Clemmons | 137/601.15 |
| 3,128,986 A | * | 4/1964 | Miller et al. | 251/175 |
| 4,655,244 A | * | 4/1987 | Park | 137/412 |
| 6,823,890 B1 | | 11/2004 | Hwang | |

* cited by examiner

*Primary Examiner* — John K Fristoe, Jr.
*Assistant Examiner* — Michael R Reid

(57) ABSTRACT

A balanced water-intake control valve includes an adjusting mechanism for the water-level between two linkage rods. The adjusting mechanism includes a first pivot guide, a second pivot guide, a lead screw and an adjusting nut. The first pivot guide is pivoted on the first linkage rod for driving a valve rod. The second pivot guide is pivoted on the second linkage rod connecting to a float body. The first and second pivot guides are connected by the lead screw at opposite ends. An adjusting nut is placed at the middle of the lead screw. By rotating the lead screw, the length between the first and second pivot guides changes. Therefore, the upper limit of the water level can be adjusted by the user after installation of the control valve.

5 Claims, 9 Drawing Sheets

BALANCED WATER-INTAKE CONTROL VALVE

FIELD OF THE INVENTION

The present invention relates to a device for water collection, storage, and distribution, especially for a balanced water-intake control valve.

BACKGROUND OF THE INVENTION

For conventional water or liquid storage devices such as water towers for industrial or civil purposes, reservoirs for breeding, or stools, a water-intake control valve is needed to install inside a storage device for automatically supplying water as the water level is low. One kind of conventional water-intake control valves is revealed by Hwang in U.S. Pat. No. 6,823,890 B1. A float body such as a hollow float ball is used to maintain the water level by connecting with a water-intake control valve which opens or closes depending on the water level. When the water level in a storage device is low, the valve/valve stopper of a conventional water-intake control valve will open to supply water flowing into the storage device. On the other hand, when the water level reaches a certain height, the valve/valve stopper will close to stop water flowing into the storage device. Unfortunately, the conventional water-intake control valve cannot adjust the water level by the user's demand since the rotational angle of the float ball is fixed. Therefore, it becomes inconvenient to the users and inefficient in water storage for being unable to change the maximum capacity of a storage device. If a user need to change the water-level upper limit, he has to change the water-intake control valve with a linkage rod of a different length or a different bending angle, which costs money and wastes time.

SUMMARY OF THE INVENTION

The main purpose of the present invention is to provide a balanced water-intake control valve which can adjust the water level in the storage device by the user's demand.

The present invention is a balanced water-intake control valve, primarily comprising a valve, a valve rod, a first linkage rod, a second linkage rod, a float body, and a water-level adjusting mechanism. The valve rod freely moving inside the valve has a valve stopper for sealing a water channel of the valve. The first linkage rod is pivoted at one end of the valve for driving the valve rod. The second linkage rod is pivoted at the other end of the valve in connection with the float body. The water-level adjusting mechanism comprises a first pivot guide, a second pivot guide, a lead screw, and an adjusting nut. The first pivot guide is pivoted at the first linkage rod and the second pivot guide is pivoted at the second linkage rod. The first and second pivot guides are connected by the lead screw at opposite ends. An adjusting nut is located at the middle of the lead screw. When the lead screw is rotated through the adjusting nut, the distance between the first pivot guide and the second pivot guide can be changed to adjust the water-level upper limit.

The balanced water-intake control valve in the present invention has the following advantages and functions:

1. An adjusting mechanism is introduced to adjust the water-level depending on the user's need: by screwing both ends of the lead screw to change the screwing length of lead screw, the height of the float body changes and then the water-level of the storage device will change.

2. A cap ring is used to fasten the upper valve base and the lower valve base of the valve; therefore, it is easy to assemble or disassemble without any external tool.

DETAILED DESCRIPTION OF THE INVENTION

With reference to the attached drawings, the present invention is described by means of the embodiment(s) below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimension ratios can be selectively designed and disposed and the detail component layouts may be more complicated.

Figure 1:
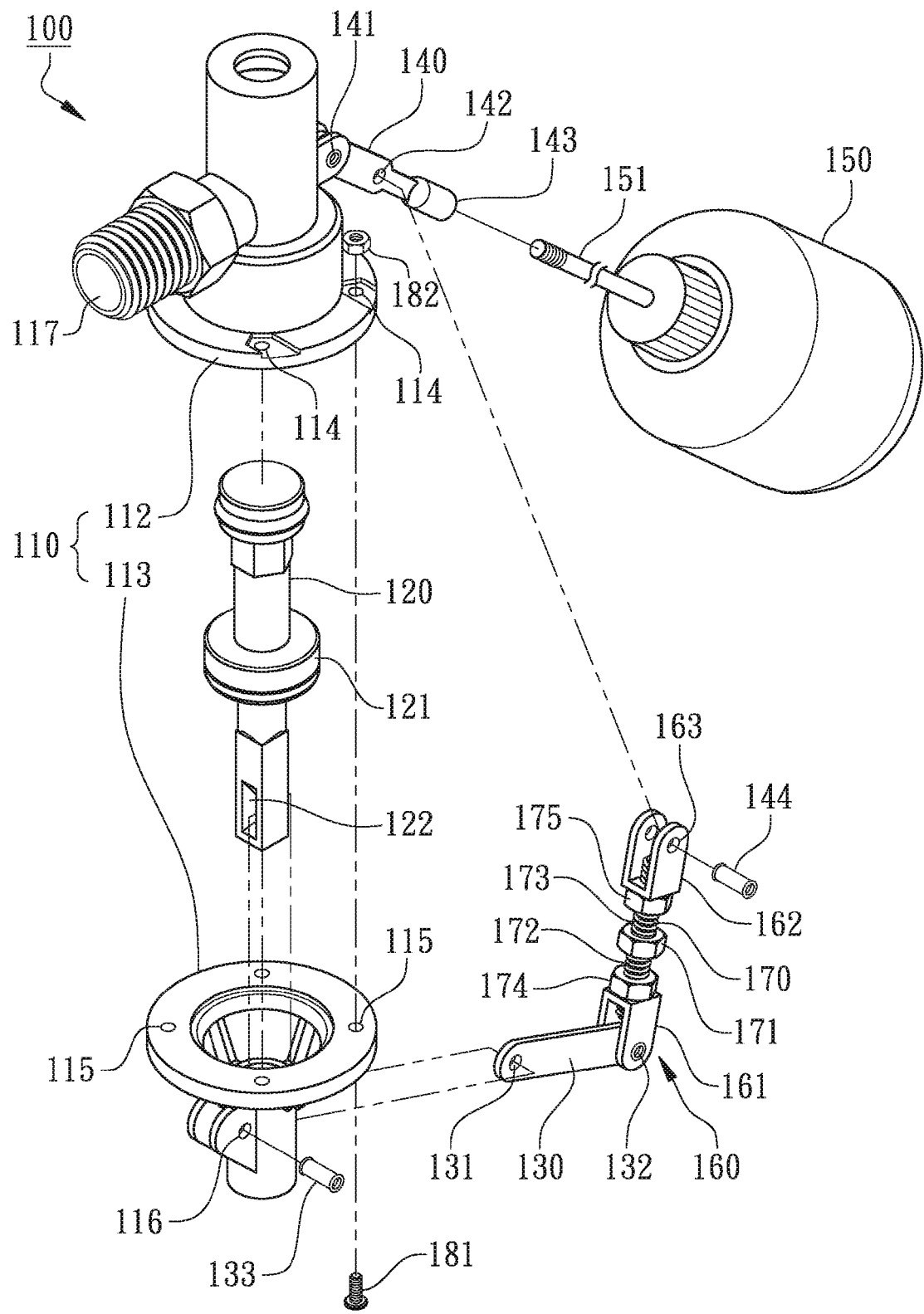
FIG. 1 is a 3D disassembled component view of a balanced water-intake control valve according to the first embodiment of the present invention.
Figure 2:
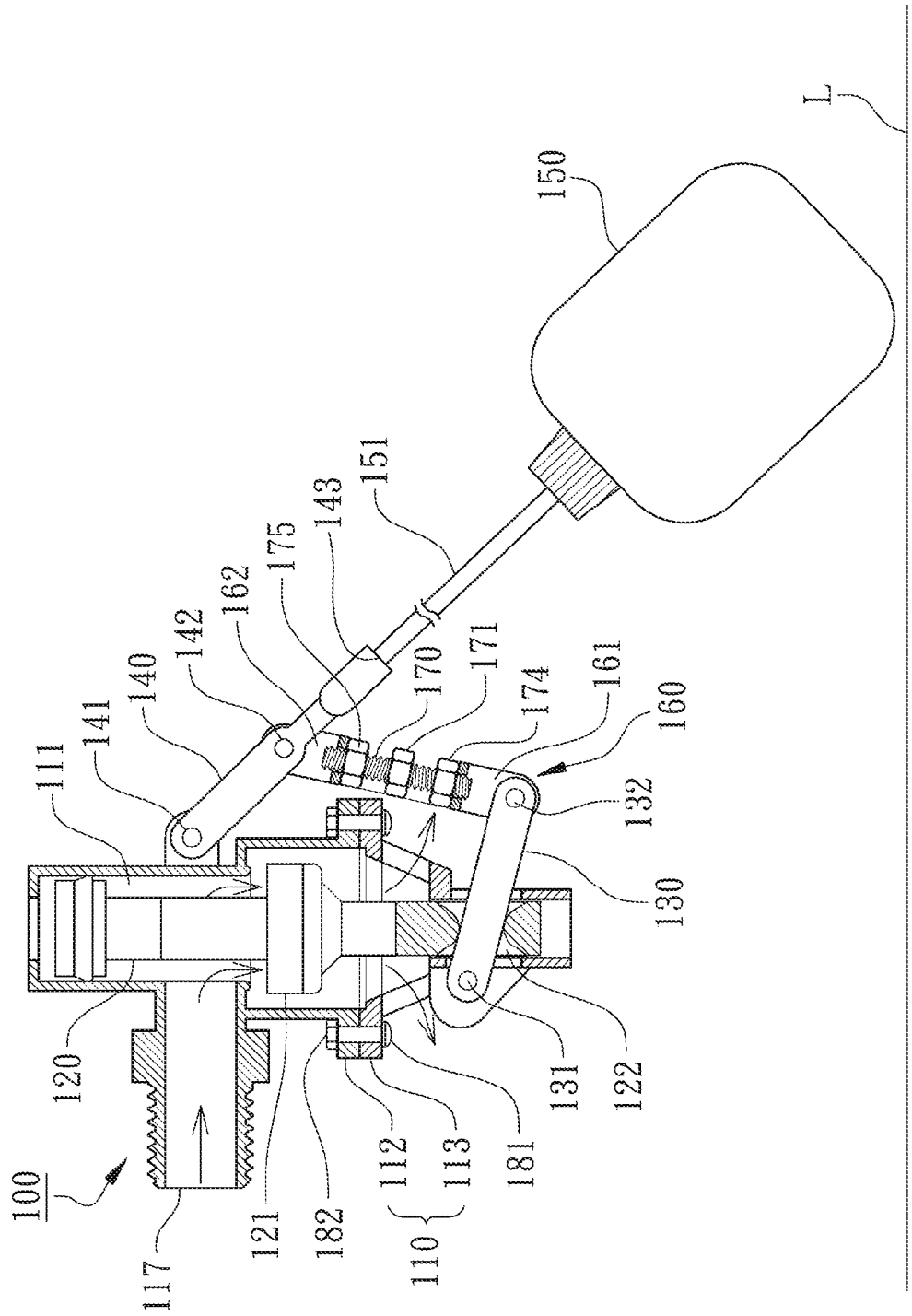
FIG. 2 is a side view illustrating the balanced water-intake control valve at low water level according to the first embodiment of the present invention.
Figure 3:
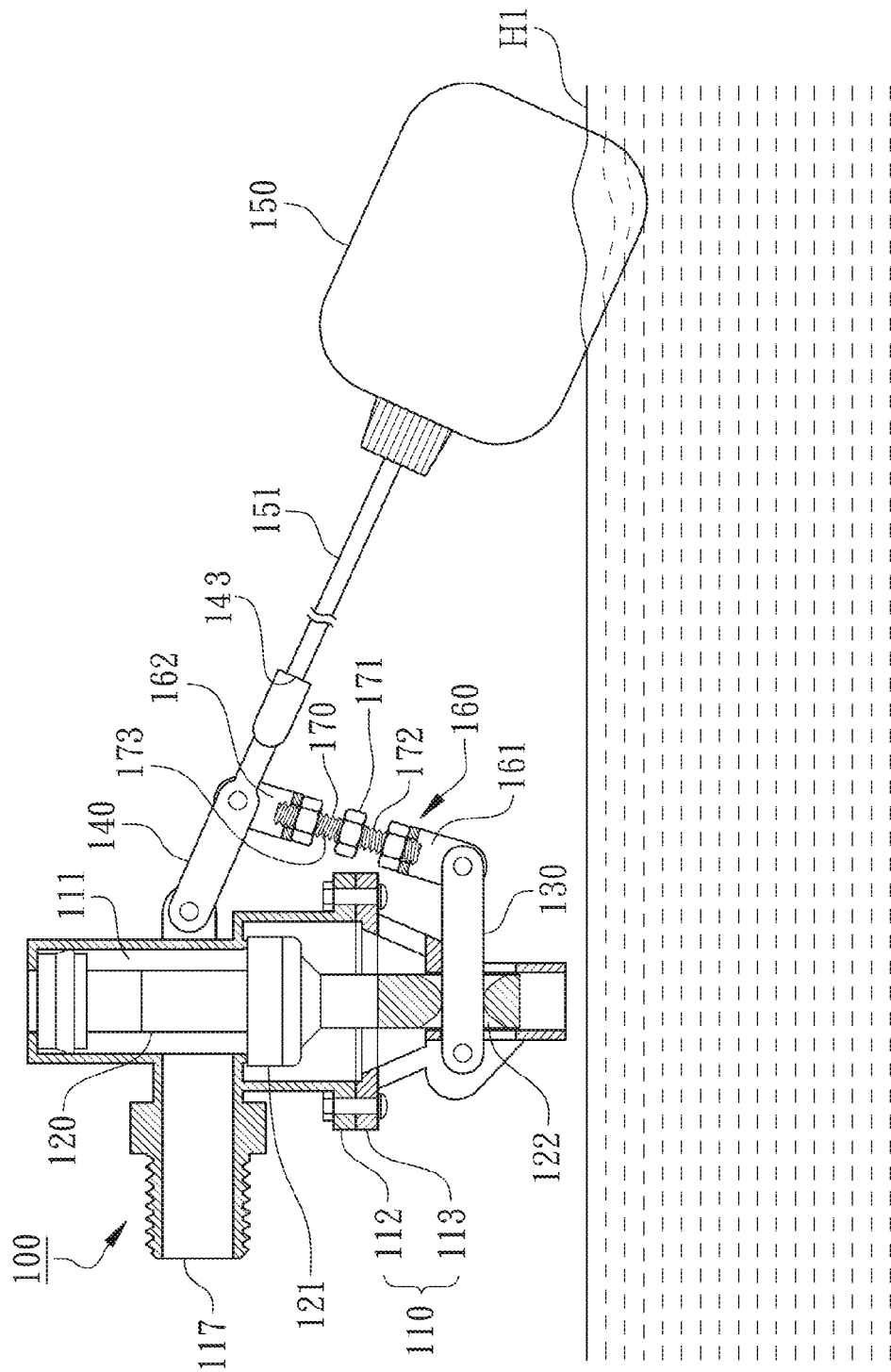
FIG. 3 is a side view illustrating the balanced water-intake control valve at a water-level upper limit of H1 according to the first embodiment of the present invention.
Figure 4:
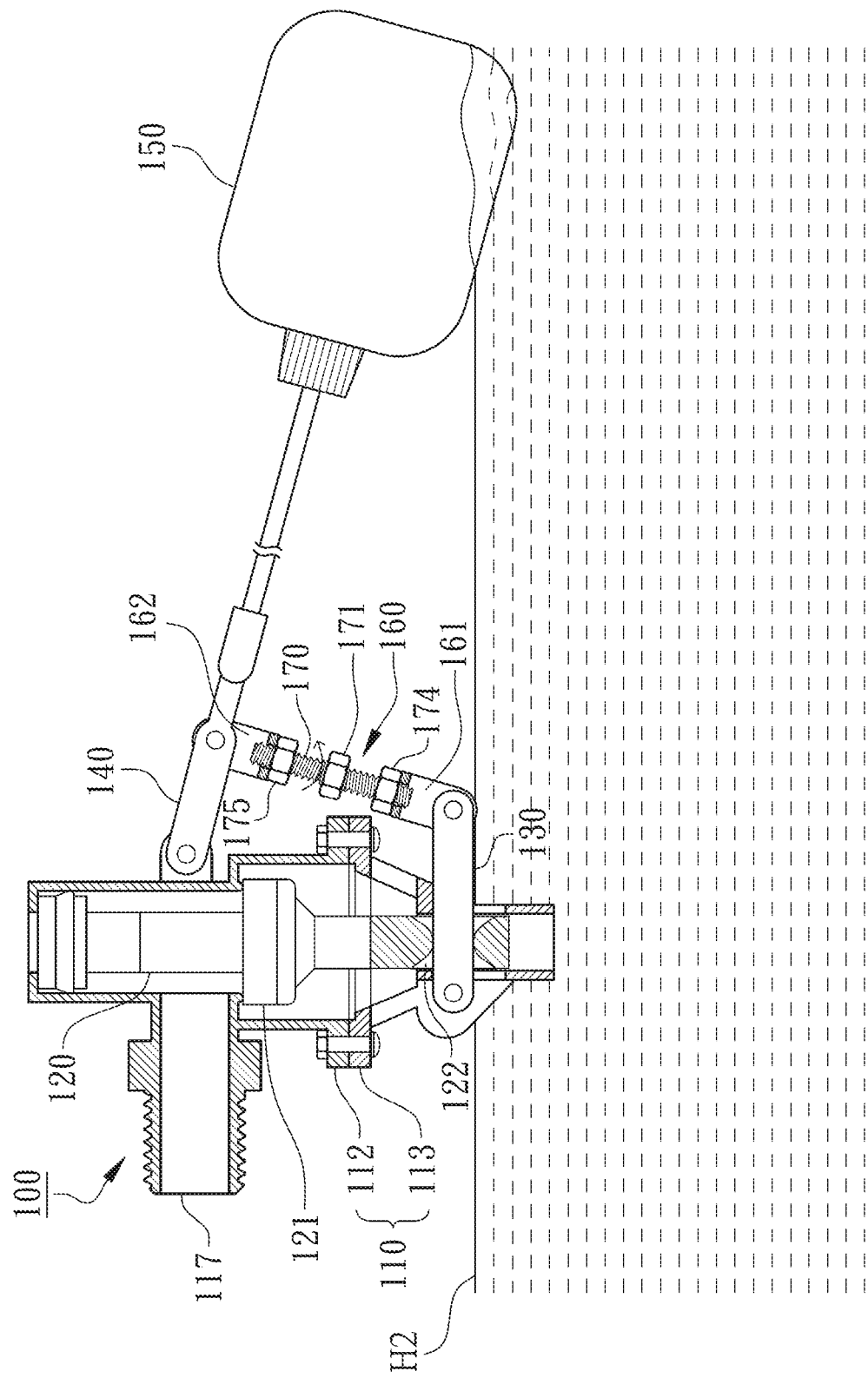
FIG. 4 is a side view illustrating the balanced water-intake control valve at another water-level upper limit of H2 according to the first embodiment of the present invention.

According to the first embodiment of the present invention, a water-intake control valve is illustrated in FIG. 1 for a 3D disassembled component view, in FIG. 2 for a side view at low water level, in FIG. 3 for a side view at high water level H1, and in FIG. 4 for a side view at high water level H2. The balanced water-intake control valve 100 primarily comprises a valve 110, a valve rod 120, a first linkage rod 130, a second linkage rod 140, a float body 150, and an adjusting mechanism 160 for water-level upper limit where the valve 110 has a water channel 111 as shown in FIG. 2 for controlling water to flow through and out of the valve 110. In one of the embodiment, the valve 110 is composed of an upper valve base 112 and a lower valve base 113 to assemble and accommodate the valve rod 120. The upper valve base 112 has a water-intake opening 117 for water to flow into the water channel 111. The lower valve base 113 has a plurality of water outlets (as shown in arrow locations of FIG. 2) for water to flow out of the valve 110. Normally, the material of the valve 110 is plastic to reduce the manufacture cost and weight. To be more specific, as shown in FIG. 1, a plurality of first through holes 114 are disposed at the peripheries of the edge ring of the upper valve base 112 and a plurality of second through holes 115 are disposed on the peripheries of the edge ring of the lower valve base 113. The balanced water-intake control valve 100 further comprises a plurality of screw bolts 181 inserting through the first through holes 114 and the second through holes 115 for mechanically jointing the upper valve base 112 and the lower valve base 113. To be more specific, a plurality of fixing nuts 182 are screwed to the corresponding screw bolts 181 to tightly joint the upper valve base 112 and the lower valve base 113 together as shown in FIG. 2.

As shown in FIG. 2 and FIG. 3, the valve rod 120 can freely move inside the valve 110 where the valve rod 120 has a valve stopper 121 for sealing the water channel 111 of the valve 110 to effectively stop water flowing into a storage device. Preferably, the valve stopper 121 is made of flexible rubber which can tightly seal the water channel 111 to stop the water flow. When the valve rod 120 moves downward, an annular gap will be formed between the valve stopper 121 and the water channel 111 so that water will flow through the gap and flow out of the lower valve base 113 to achieve water intake as shown by the arrows in FIG. 2. Therefore, the moving up and down of the valve rod 120 is able to supply water or stop water flowing into a storage device.

As shown in FIG. 2, the first linkage rod 130 is pivoted at the valve 110 for driving the valve rod 120. As shown in FIG. 1 and FIG. 2 again, the first linkage rod 130 has a first pivot point 131 where a joint bolt 133 is inserted at the first pivot point 131 and through the pivot hole 116 to make the first linkage rod 130 to be pivoted at the valve 110. In the present embodiment, the pivot hole 116 is disposed at the lower valve base 113 so that the first linkage rod 130 is pivoted to the lower valve base 113. The first linkage rod 130 further has a second pivot point 132 to make the first linkage rod 130 to be pivoted at the lower end of the adjusting mechanism 160 through another joint bolt (not shown in the figure). The first pivot point 131 and the second pivot point 132 are individually located at two ends of the first linkage rod 130 so that the first linkage rod 130 is rotatable.

As shown in FIG. 2, the second linkage rod 140 is pivoted at the valve 110. In the present embodiment, the second linkage rod 140 has a third pivot point 141 to make the second linkage rod 140 to be pivoted at the upper valve 112 of the valve 110 by a joint bolt (not shown in the figure). As shown in FIG. 1 and FIG. 2, the second linkage rod 140 further has a fourth pivot point 142 to make the second linkage rod 140 to be pivoted at the top end of the adjusting mechanism 160 by inserting a joint bolt 144 at the fourth pivot point 142 and through the pivot hole 163 of the adjusting mechanism 160. To be more specific, the second linkage rod 140 further has a connecting end 143 connecting to the float body 150 through the float body connecting rod 151. The fourth pivot point 142 is located between the third pivot point 141 and the connecting end 143 to create an effort-saving lever. In the present embodiment, the second linkage rod 140 can be a flat strip rod in the shape of "I".

As shown in FIG. 1 and FIG. 2, the float body 150 is connected with the second linkage rod 140. The float body 150 is connected and fixed to a float body connecting rod 151 where the float body connecting rod 151 is screwed to the connecting end 143 of the second linkage rod 140 to create a module for easy assembly and disassembly. In the present embodiment, the float body 150 can be a float ball.

As shown in FIG. 2 and FIG. 3, both ends of the adjusting mechanism 160 are individually pivoted to the first linkage rod 130 and the second linkage rod 140 so that the second linkage rod 140 can drive the first linkage rod 130 through the adjusting mechanism 160. As shown in FIG. 2, when the water level is low, the float body 150 exerts a downward force at the connecting end 143 of the second linkage rod 140 caused by the weight of the float body 150. The first linkage rod 130 driven by the adjusting mechanism 160 will rotate correspondingly to lower the valve rod 120 of the balanced water-intake control valve 100 to supply water flowing into a storage device. As shown in FIG. 3, when the water level reaches the upper limit H1, the float body 150 exerts an upward force at the connecting end 143 of the second linkage rod 140 caused by the buoyancy of the float body 150. The first linkage rod 130 driven by the adjusting mechanism 160 will push the valve stopper 121 for sealing the water channel 111 in the balanced water-level control valve 100 to stop water flowing into a storage device.

As shown in FIG. 1, the adjusting mechanism 160 comprises a first pivot guide 161, a second pivot guide 162, a lead screw 170, and an adjusting nut 171. The first pivot guide 161 is pivoted at the first linkage rod 130 and the second pivot guide 162 is pivoted at the second linkage rod 140. In the present embodiment, the first pivot guide 161 and the second pivot guide 162 are U-shaped plates disposed and connected to the first linkage rod 130 and the second linkage rod 140 respectively. Furthermore, as shown in FIG. 2, the first linkage rod 130 is pivoted at the lower valve base 113 and the second linkage rod 140 is pivoted at the upper valve base 112, wherein the valve rod 120 has a linkage hole 122 in which the first linkage rod 130 is inserted to linearly move the valve rod 120 to supply water or to stop water flowing into a storage device as shown in FIG. 2. The first linkage rod 130 is inserted between the first pivot point 131 with the lower valve base 113 and the second pivot point 132 with the first pivot guide 161 to form an effort-saving lever for sealing the water channel 111 by the valve stopper 121.

As shown in FIG. 1, both ends of the lead screw 170 are individually screwed to the first pivot guide 161 and the second pivot guide 162. To be more specific, the first pivot guide 161 and the second pivot guide 162 have small sections of internal screws (not shown in the figure) to screw to the lead screw 170. As shown in FIG. 2, the adjusting nut 171 is located at the middle of the lead screw 170. The lead screw 170 can be rotated by the adjusting nut 171. When rotating the lead screw 170, the distance between the first pivot guide 161 and the second pivot guide 162 is changed. In other words, the adjustable length of the adjusting mechanism 160 can be adjusted by rotating the lead screw 170.

The lead screw 170 has a clockwise screw portion 172 and a counterclockwise screw portion 173 to individually screw to the internal screws of the first pivot guide 161 and to the internal screws of the second pivot guide 162 so that both ends of the lead screw 170 are simultaneously screwed to the first pivot guide 161 and the second pivot guide 162. By adjusting the adjusting nut 171 to rotate the lead screw 170, the distance between the first pivot guide 161 and the second pivot guide 162 can be changed, i.e., to move the first pivot guide 161 close to or away from the second pivot guide 162, so that the adjustable length of the adjusting mechanism 160 can be increased or shortened. Preferably, as shown in FIG. 2, the adjusting mechanism 160 further comprises a first constraining nut 174 and a second constraining nut 175 where the first constraining nut 174 is screwed to the clockwise screw portion 172 of the lead screw 170 (as shown in FIG. 1) which can be rotated and moved between the first pivot guide 161 and the adjusting nut 171. The second constraining nut 175 is screwed to the counterclockwise screw portion 173 of the lead screw 170 (as shown in FIG. 1) which also can be rotated and moved between the second pivot guide 162 and the adjusting nut 171. When the first constraining nut 174 is tightly jointed to the first pivot guide 161 and the second constraining nut 175 is tightly jointed to the second pivot guide 162, the distance between the first pivot guide 161 and the second pivot guide 162 can be firmly constrained without any clearance.

As shown in FIG. 3 and FIG. 4, the user can easily change the water-level upper limit from H1 to H2 by adjusting the adjusting nut 171 to increase the distance between the first pivot guide 161 and the second pivot guide 162 so as to increase the upper limit height of the float body 150 so that the desired water level can be raised from the original water-level upper limit H1 to the final water-level upper limit H2 to achieve the maximum capacity of a storage device. On the contrary, the user also can easily reduce the water-level upper limit by adjusting the adjusting nut 171 to shorten the distance between the first pivot guide 161 and the second pivot guide 162 so as to decrease the upper limit height of the float body 150 so that the water level can be reduced to decrease the maximum capacity of a storage device. Therefore, through screwing both ends of the lead screw 170 to the first pivot guide 161 and to the second pivot guide 162, the adjustable length of the adjusting mechanism 160 can be increased or shortened so that the second linkage rod 140 connected to the float body 150 can show different angles at different water-level upper limits to achieve the maximum capacity of a storage device by rotating the lead screw 170 according to the needs of the user after installation.

The specific operation mechanism of the balanced water-intake control valve 100 is described in detail as follows.

The balanced water-intake control valve 100 is installed inside a water storage device where the balanced water-intake control valve 100 of the present invention is most suitable for shallow water level such as cooling tower or water storage tower. As shown in FIG. 2, when the water level of a water storage device is low and the water has not yet touched the float body 150, the end of the second linkage rod 140 connected to the float body 150 is fallen under gravitation forces to cause the adjusting mechanism 160 moving downward to drive the first linkage rod 130 so as to push the valve rod 120 and the valve stopper 121 linearly moving downward so water will flow from the water intake opening 117 through the water channel 111 into the storage device to make the water level to rise.

As shown in FIG. 3, when the water level reaches the water-level upper limit H1 the float body 150 connected with the second linkage rod 140 is raised to reach a certain height by buoyancy, the connecting end 143 of the second linkage rod 140 connected to the float body 150 also moves upward to rotate the second linkage rod 140 to cause the adjusting mechanism 160 to move upward so as to drive the first linkage rod 130 where the first linkage rod 130 pushes the valve rod 120 with the valve stopper 121 to linearly move upward until the valve stopper 121 seals the water channel 111 to stop the water flowing into a storage device.

Especially, as shown in FIG. 4, when the water-level upper limit H2 is assigned by the user, the adjusting mechanism 160 can be implemented to adjust the water-level of upper limit to reach the maximum capacity of a storage device. As shown in FIG. 3 and FIG. 4, the distance between the first pivot guide 161 and the second pivot guide 162 can be increased to increase the upper limit height of the float body 150 (the water-level upper limit from H1 to H2) to increase the maximum capacity of a storage device by rotating the adjusting nut 171 along with the clockwise screw portion 172 and the counterclockwise screw portion 173 to move the first pivot guide 161 and the second pivot guide 162 away from the adjusting nut 171. When the water level has not yet reached the upper limit height H2 of the float body 150 after adjusting, the second linkage rod 140 through the adjusting mechanism 160 have not yet driven the first linkage rod 130 to close the balanced water-intake control valve 100. This is because the valve rod 120 and the valve stopper 121 do not rise to the closed state by elongating the adjusting mechanism 160. The water will keep flowing into a storage device if the water level is still below the water-level upper limit H2.

As shown in FIG. 4, when the float body 150 reaches the upper limit height through buoyancy after adjusting to the water-level upper limit H2, the second linkage rod 140 is driven to move the first linkage rod 130 through the adjusting mechanism 160 to stop the water flowing into the storage device. On the contrary, when the user wants to reduce the maximum capacity of a storage device, the adjusting nut 171 and the lead screw 170 can be rotated to make the first pivot guide 161 and the second pivot guide 162 to move toward the adjusting nut 171 along the clockwise screw portion 172 and the counterclockwise screw portion 173 of the lead screw 170 to shorten the distance between the first pivot guide 161 and the second pivot guide 162 so that the float body 150 can be lowered to a specific height to reduce the water-level upper limit to achieve the desired maximum capacity of a storage device by the user. Therefore, through screwing both ends of the lead screw 170 to the first pivot guide 161 and to the second pivot guide 162, the adjustable length of the adjusting mechanism 160 can be increased or shortened to set the water-level upper limit so that the second linkage rod 140 connected to the float body 150 can show different angles at different water-level upper limit to achieve the maximum capacity of a storage device by adjusting the upper limit height of the float body 150 so as to further adjust the water-level upper limit between H1 and H2 according to the needs of the user after installation.

Figure 5:
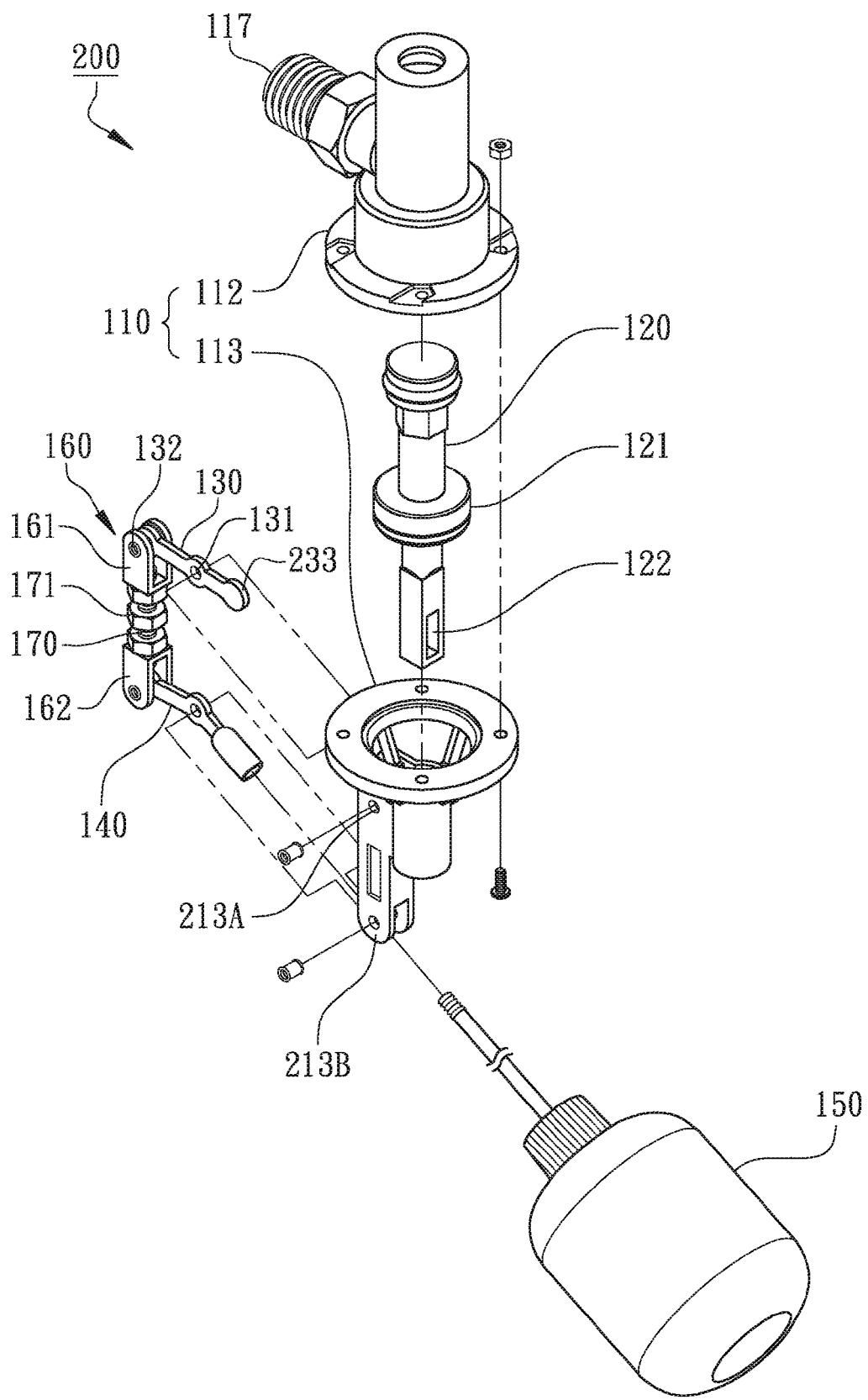
FIG. 5 is a 3D disassembled component view of a balanced water-intake control valve according to the second embodiment of the present invention.
Figure 6:
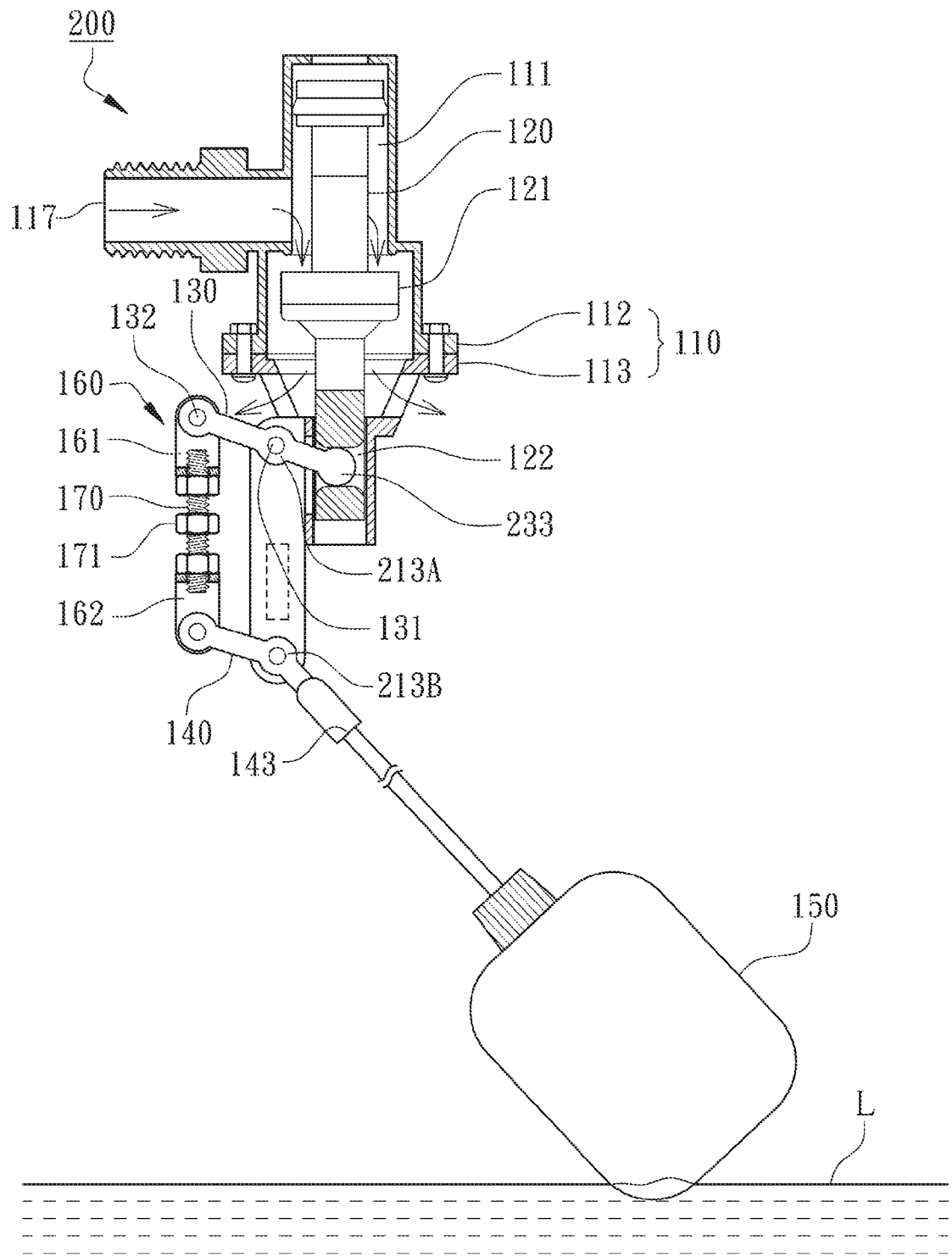
FIG. 6 is a side view illustrating the balanced water-intake control valve at low water level according to the second embodiment of the present invention.
Figure 7:
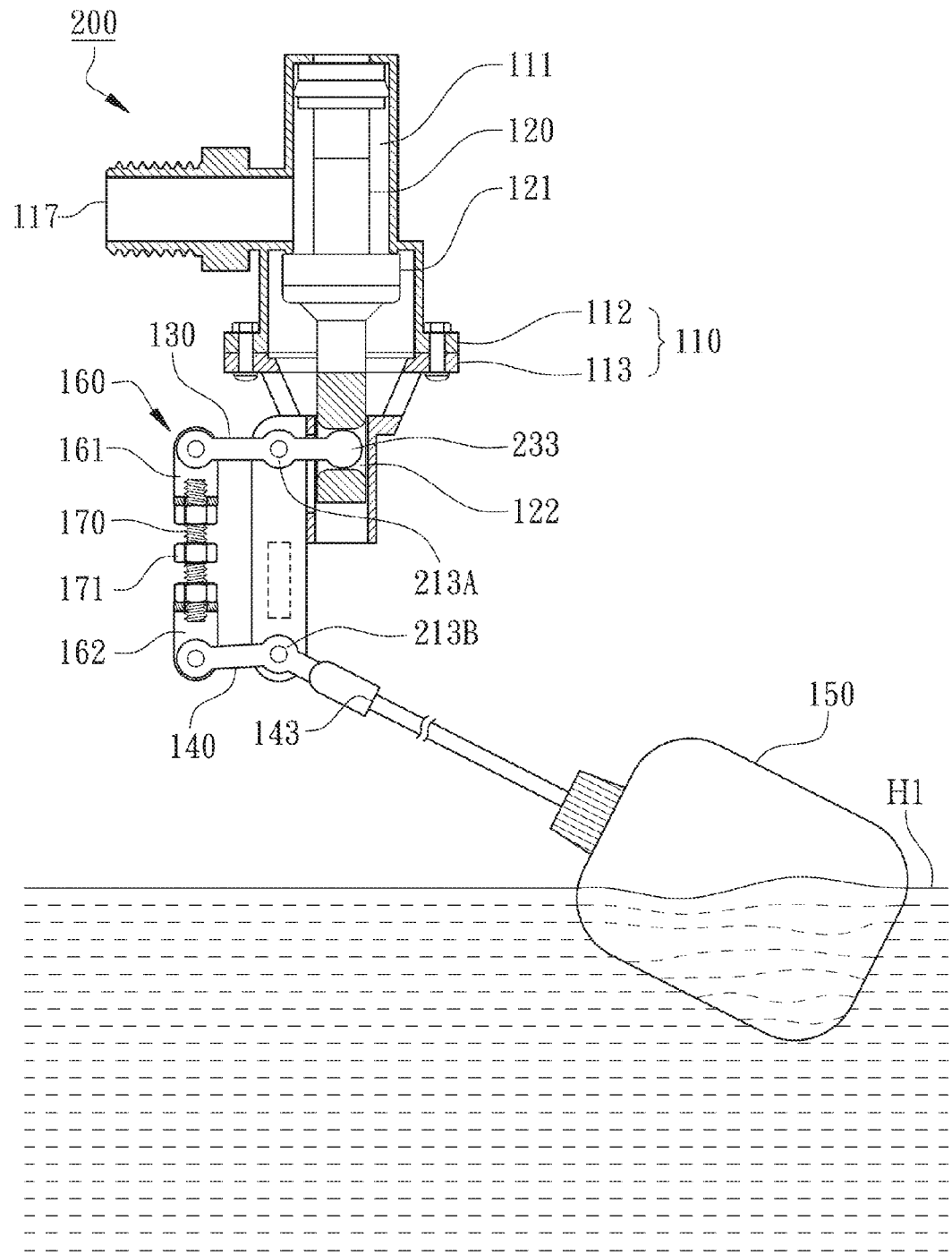
FIG. 7 is a side view illustrating the balanced water-intake control valve at water-level upper limit of H1 according to the second embodiment of the present invention.

According to the second embodiment of the present invention, another balanced water-intake control valve is illustrated in FIG. 5 for a 3D disassembled component view, in FIG. 6 for a side view at low water level H1, and in FIG. 7 for a side view at high water level H1. The major components with the corresponding numbers showing the same functions are the same as described in the first embodiment which will not further be described in detail. The balanced water-intake control valve 200 primarily comprises a valve 110, a valve rod 120, a first linkage rod 130, a second linkage rod 140, a float body 150, and an adjusting mechanism 160 for water-level upper limit where the adjusting mechanism 160 comprises a first pivot guide 161, a second pivot guide 162, a lead screw 170, and an adjusting nut 171.

As shown in FIG. 6 and FIG. 7, the valve rod 120 can freely move inside the valve 110 where the valve rod 120 has a valve stopper 121 for sealing the water channel 111 of the valve 110 to effectively stop water flowing into a storage device. The first pivot point 131 and the second pivot point 132 of the first linkage rod 130 are individually pivoted at the valve 110 and at the adjusting mechanism 160 where the first linkage rod 130 is configured for driving the valve rod 120. A portion of the second linkage rod 140 is pivoted at the valve 110. One end of the second linkage rod 140 is pivoted at the adjusting mechanism 160, the other end 143 of the second linkage rod 140 is connected to the float body 150 where the second linkage rod 140 is driven by the float body 150. In the present embodiment, the second linkage rod 140 is in a shape of "V"

to have a better strength for bending. In the present embodiment, as shown in FIG. 6, the adjusting mechanism 160 and the water-intake opening 117 are disposed on the same side of the valve 110 where the diameter of the water-intake opening 117 can be enlarged and the volume of the float body 150 can be increased for longer operation ranges according to the needs of the user.

As shown in FIG. 5 and FIG. 6, in the present embodiment, the first linkage rod 130 is pivoted at a first position 213A of the lower valve base 113 and the second linkage rod 140 is pivoted at a second position 213B of the lower valve base 113. The second position 213B is vertically lower than the first position 213A. The valve rod 120 has a linkage hole 122 in which the first linkage rod 130 is inserted. To be more specific, a pushing head 233 is formed at one end of the first linkage rod 130 opposing to the second pivot point 132 of the first linkage rod 130 with the first pivot guide 161 for driving the valve rod 120 for linear movement to achieve the operation of supply water or stop water flowing into a storage device as shown in FIG. 6 and FIG. 7. The better shape of the pushing head 233 is circular or arc. The diameter of the pushing head 233 is larger than the width of the first linkage rod 130. As shown in FIG. 6, in the present embodiment, the first pivot point 131 of the first linkage rod 130 connected with the lower valve base 113 can be located between the linkage hole 122, i.e., the pushing head 233, and the second pivot point 132 of the first linkage rod 130 connected with the first pivot guide 161 as a lever point. The first position 213A is located above the second position 213B where the second position 213B can be located at an extruded edge of the lower valve base 113 extending downward so that the pivot point of the first linkage rod 130 is higher than the pivot point of the second linkage rod 140.

As shown in FIG. 6, when the water level is at the water-level lower limit L, the float body 150 moves downward to rotate the second linkage rod 140 to make the adjusting mechanism 160 to move upward so as to rotate the first linkage rod 130 so that the valve rod 120 and the valve stopper 121 linearly move downward to enable water flowing through the water channel 111 to continually raise the water level.

As shown in FIG. 7, when the water level reaches the upper limit H1, the float body 150 connected with the second linkage rod 140 is raised to a certain height from the water-level upper limit H1 by buoyancy. The connecting end 143 of the second linkage rod 140 connected to the float body 150 moves upward so as to lower the adjusting mechanism 160 by rotating the second linkage rod 140. The first linkage rod 130 is driven to linearly move the valve rod 120 and the valve stopper 121 upward until the water channel 111 is sealed by the valve stopper 121 to stop water flowing into a storage device. Using the same adjusting method as mentioned in the first embodiment, when the user wants to increase the maximum capacity of a storage device, the adjustable length of the adjusting mechanism 160 can be changed by rotating the lead screw 170 such as increasing the adjustable length of the adjusting mechanism 160 to raise the water-level upper limit (full water level) to increase the maximum capacity of a storage device.

Figure 8:
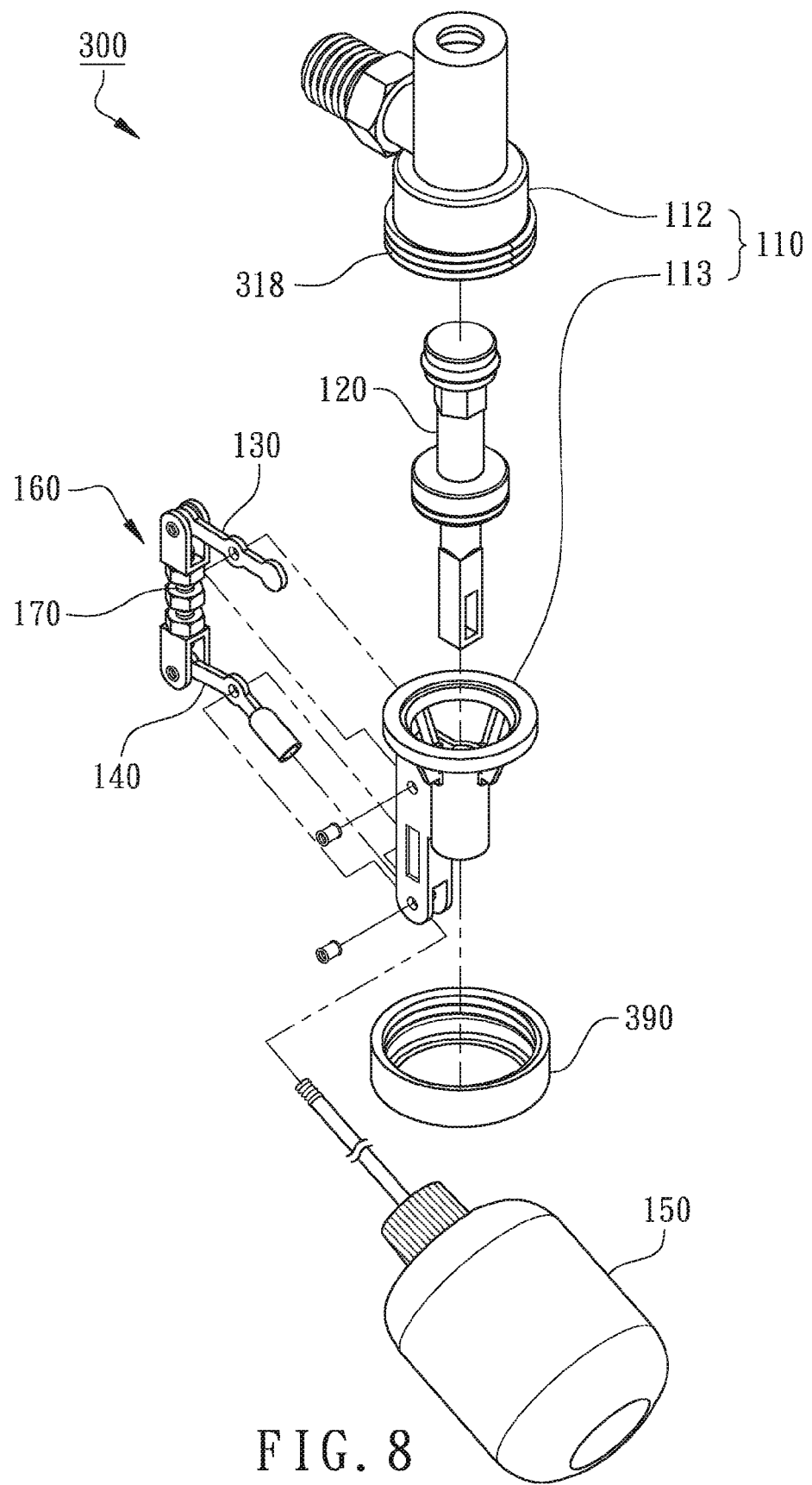
FIG. 8 is a 3D disassembled component view of a balanced water-intake control valve according to the third embodiment of the present invention.
Figure 9:
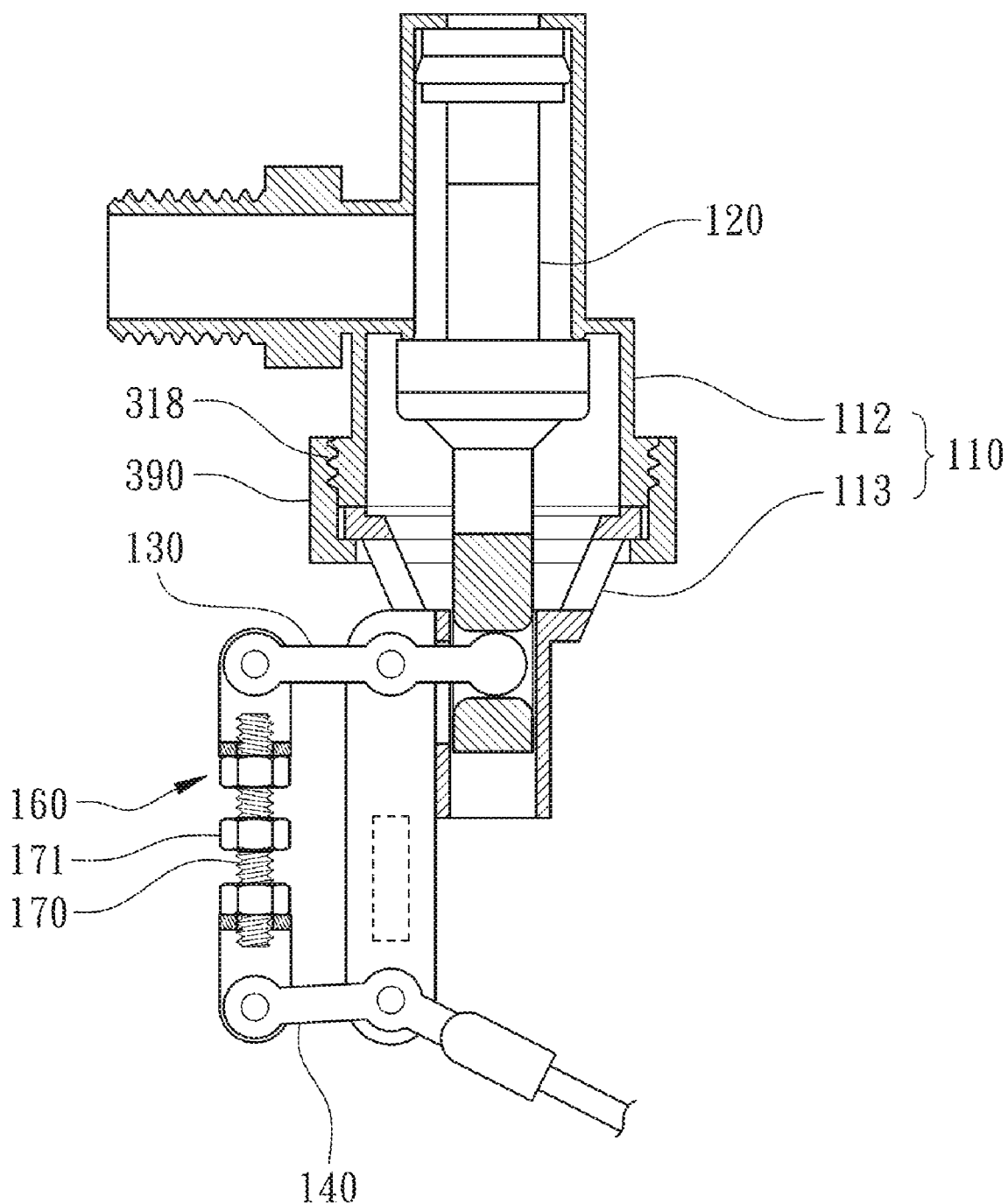
FIG. 9 is a partial side view of the balanced water-intake control valve according to the third embodiment of the present invention.

According to the third embodiment of the present invention, another balanced water-intake control valve is illustrated in FIG. 8 for a 3D disassembled component view and in FIG. 9 for a partial side view. The major components with the corresponding numbers showing the same functions will be the same as described in the first embodiment which will not further be described in detail. The balanced water-intake control valve 300 primarily comprises a valve 110, a valve rod 120, a first linkage rod 130, a second linkage rod 140, a float body 150, and an adjusting mechanism 160 for water-level upper limit.

As shown in FIG. 8 and FIG. 9, the valve rod 120 can freely move inside the valve 110 for sealing the valve 110 to effectively stop water flowing into a storage device. Both ends of the first linkage rod 130 are pivoted at the valve 110 and at the adjusting mechanism 160. The second linkage rod 140 is pivoted at the valve 110 where one end of the second linkage rod 140 is connected to the float body 150 and the other end is pivoted at the adjusting mechanism 160. The adjustable length of the adjusting mechanism 160 can be changed by rotating the lead screw 170 through the adjusting nut 171.

In the present embodiment, external screws 318 are disposed at the peripheries of the bottom of the upper valve base 112. The balanced water-intake control valve 300 further comprises a cap ring 390 covering the peripheries of the lower valve base 113 and screwed to the external screws 318 of the upper valve base 112 to tightly hold on to the lower valve base 113 of the valve 110 make the upper valve base 112 and the lower valve base 113 tightly joint together without external tools such as screw drivers for easy assembly and disassembly.

The above description of embodiments of this invention is intended to be illustrative but not limited. Other embodiments of this invention will be obvious to those skilled in the art in view of the above disclosure which still will be covered by and within the scope of the present invention even with any modifications, equivalent variations, and adaptations.

What is claimed is:

1. A balanced water-intake control valve comprising:
   a valve having a water channel, the valve including an upper valve base and a lower valve base;
   a valve rod movably disposed inside the valve, the valve rod including a valve stopper for sealing the water channel of the valve and a linkage hole, a portion of the valve rod comprising the linkage hole guided within the lower valve base;
   a first linkage rod pivotably connected to the lower valve base and passing through the linkage hole for driving the valve rod;
   a second linkage rod pivotably connected to the upper valve base;
   a float body connected to the second linkage rod; and
   a water-level adjusting mechanism, comprising:
      a first pivot guide pivotably connected to the first linkage rod,
   the first linkage rod engaging the valve rod at a location on the first linkage rod that is between a pivot point with the lower valve base and a pivot point with the first pivot guide;
      a second pivot guide pivotably connected to the second linkage rod;
      a lead screw with ends respectively screwing to the first pivot guide and to the second pivot guide;
      an adjusting nut placed in a middle portion of the lead screw to rotate the lead screw to change a distance between the first pivot guide and the second pivot guide, the lead screw having a clockwise screw portion screwing to one of the first pivot guide and the second pivot guide, and a counterclockwise screw portion screwing to the other one of the first pivot guide and the second pivot guide;
      a first constraining nut engaged on the lead screw between the first pivot guide and the adjusting nut; and a second constraining nut engaged on the lead screw between the second pivot guide and the adjusting nut.

2. The control valve as claimed in claim 1, wherein a plurality of first through holes are formed in peripheries of the upper valve base and a plurality of second through holes are formed in peripheries of the lower valve base, the control valve further comprising a plurality of screw bolts inserted through the first through holes and the second through holes for mechanically joining the upper valve base and the lower valve base.

3. The control valve as claimed in claim 1, wherein peripheries of a bottom of the upper valve base are formed as an external screw, and the control valve further comprises a cap ring covering peripheries of the lower valve base and screwed to the external screw to join the upper and lower valve bases.

4. The control valve as claimed in claim 1, wherein the float body is a float ball.

5. The control valve as claimed in claim 1, wherein the first pivot guide and the second pivot guide are U-shaped plates.

* * * * *